Sept. 12, 1961  G. A. LYON  2,999,722
WHEEL COVER
Original Filed Nov. 23, 1955

Inventor
George Albert Lyon

2,999,722
WHEEL COVER
George Albert Lyon, 13881 W. Chicago Blvd., Detroit 28, Mich.
Original application Nov. 23, 1955, Ser. No. 548,709. Divided and this application Dec. 27, 1956, Ser. No. 630,989
3 Claims. (Cl. 301—37)

The present invention relates to improvements in wheel structures and more particularly concerns the ornamental and protective covering of the outer sides of vehicle wheels.

The present invention is a division of my application Serial No. 548,709 filed November 23, 1955.

An important object of the present invention is to provide an improved wheel cover having a novel reinforcement structure in conjunction with retaining flange structure.

Another object of the invention is to provide in a self retaining sheet metal vehicle wheel cover an improved work hardened retaining flange and marginal structure.

Figure 2:
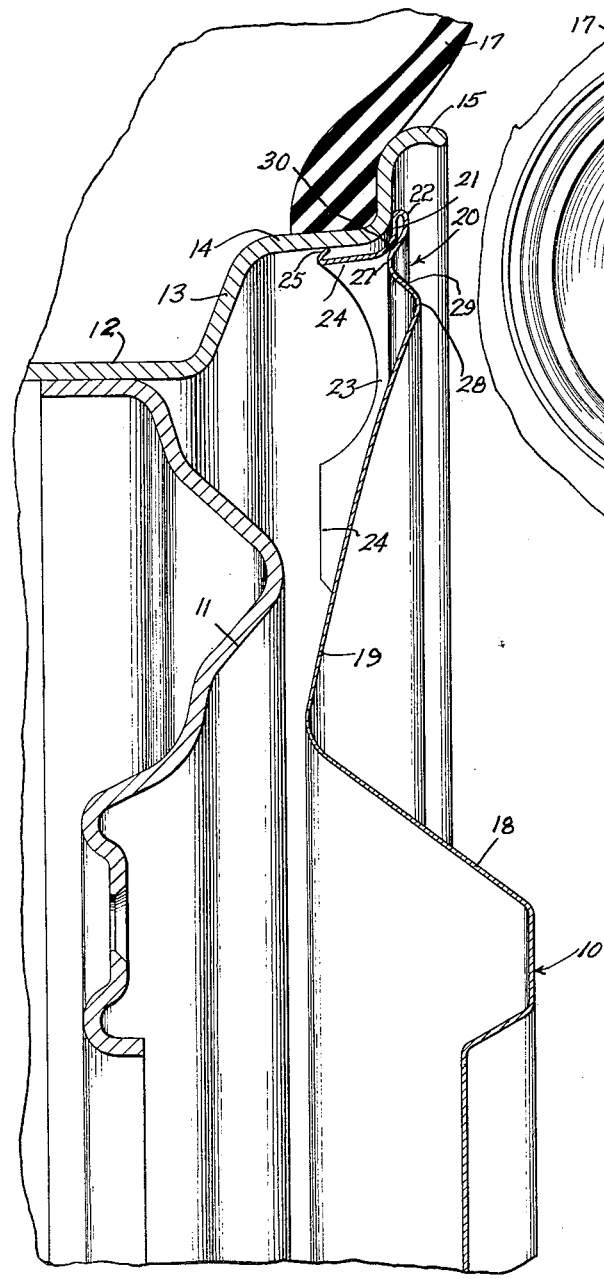
Figure 1:
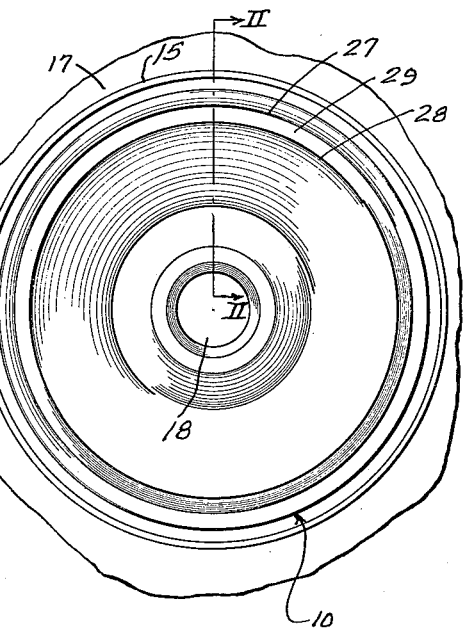

Other objects, features and advantages of the present invention will be readily apparent from the following detailed description of a preferred embodiment thereof taken in conjunction with the accompanying drawings in which:

FIGURE 1 is an outer side elevational view of a wheel structure embodying features of the invention; and FIGURE 2 is an enlarged fragmentary radial sectional view taken substantially on the line II—II of FIGURE 1.

A cover 10 according to the present invention is constructed and arranged for disposition at the outer side of a vehicle wheel including a wheel body 11 supporting a multiflange drop center tire rim including a base flange 12, a generally radially outwardly projecting and axially outwardly facing side flange 13 merging with a generally radially inwardly facing annular intermediate flange 14 that leads at its axially outer side into a terminal flange 15. The tire rim is adapted to support a pneumatic tire and tube or a tubeless tire 17.

As shown, the cover 10 comprises a full disk cover that is adapted to overlie entirely the wheel body 11 and a substantial portion of the tire rim. To this end, the cover 10 includes a central crown portion 18 merging with an intermediate annular inwardly dished portion 19 that extends from the crown radially outwardly to an annular cover margin 20 which in assembly with the wheel overlies the tire rim and more particularly the intermediate flange 14 and the adjacent portion of the terminal flange 15. The material of the cover 10 comprises a suitable gauge sheet metal such as stainless steel, brass aluminum alloy, or the like susceptible of cold drawing and working.

According to the present invention, the cover margin 20 is provided with means for retaining the cover on the wheel in press-on, pry-off relation and is constructed to afford work hardened, resilient structure. By preference the cover retaining means comprises a structure substantially according to my Patent 2,624,634, issued January 6, 1953. This includes an underturned annular generally radially inwardly extending marginal flange 21 providing at juncture thereof with the edge of the cover a reinforcing and finishing bead-like annular edge 22.

In assembly with the wheel, the underturned flange 21 is adapted to bear against the terminal flange 15 adjacent juncture with the intermediate flange 14 and projects radially inwardly beyond such juncture to a generally axially inwardly extending annular flange extension portion 23 which is adapted to lie in radially inwardly spaced relation generally telescoped within the axially outer portion of the intermediate flange 14. At suitable intervals such as eight to sixteen, the flange extension portion 23 is provided with generally axially inwardly extending retaining finger extensions 24 provided with short and stiff generally radially and axially outwardly extending oblique retaining finger terminals 25 that are engageable edgewise in retaining gripping relation against the inner surface of the intermediate flange 14. Normally the retaining fingers 24 and more particularly the terminals 25 thereof project to a slightly greater diameter than the diameter of the engaged portion of the intermediate flange 14 so that upon pressing the cover axially inwardly onto the wheel, the retaining fingers 24 are flexed resiliently radially inwardly as the retaining terminals 25 cam along the slope of the intermediate flange 14 into the ultimate retaining gripping engagement with the rim flange.

As the retaining fingers 24 are flexed resiliently radially inwardly, about the entire perimeter of the cover, the flange portion 23 is also resiliently flexed for mutually resiliently tensioning the retaining fingers 24. Such tensioning and flexing action of the flange portion 23 is also reflected in flexing of the underturned flange 21 and a tensioning of the overlying portion of the cover margin 20.

Since tensioning of the retaining fingers 24 is an important factor in affording efficient cover retaining thrust of the retaining terminals 25 against the tire rim flange 14, means are provided in the cover margin 20 for stiffening the same and enhancing the resilient tensioning action of the cover marginal structure relative to the retaining fingers 24. To this end an annular reinforcing rib 27 is provided in the cover margin 20 projecting generally axially inwardly and backed up against the juncture of the flange portions 21 and 23, as indicated at 30. Radially inwardly contiguous the indented rib 27 is a generally axially outwardly projecting annular reinforcing rib 28. These ribs 27 and 28 afford a generally corrugated appearance to the cover margin 20 and mutually cooperate to reinforce and resiliently stiffen the cover margin.

It will also be observed that the reinforcing ribs 27 and 28 are disposed in substantially direct shouldering thrust alignment with the retaining flange juncture shoulder 30 and that a connecting flange 29 that provides the radially inner side of the rib 27 and the radially outer side of the rib 28 is in reinforcing strut relation to the retaining flange juncture shoulder in a plane obliquely intersecting the generally axial plane of the retaining fingers 24, the flange 29 extending generally radially outwardly and axially inwardly toward the retaining flange juncture shoulder 30. Thus, as the retaining fingers 24 and thus the flange 23 are deflected resiliently radially inwardly and retaining flange structure is backed up and fulcrums upon the rib 27, thereby substantially stiffening the action of the fingers as they ride home along the intermediate flange 14.

In addition, of course, the reinforcing rib structure of the cover margin 20 affords substantial advantage in that during pry-off when a pry-off tool such as a screw-driver is applied behind the turned under edge 22 and the flange 21 and pry-off force supplied, the cover margin is highly resistant to undesirable deformation or damage.

During the drawing and working of the sheet metal from which the cover is made, the underturned flange 21 and the flange extension 23 as well as the retaining fingers 24 are all cold worked for thereby imparting substantial resilient stiffness thereto. Then, the cold working hardness and resilience of the cover margin is enhanced by the additional working of the material in the marginal reinforcing ribs 27 and 28 and more particularly in the rib side flange 29. This substantially enhances the reinforcing effectiveness of the reinforcing ribs in the cover margin.

It will be understood that modifications and variations may be effected without departing from the scope of the novel concepts of the present invention.

I claim as my invention:

1. In a wheel structure including a tire rim having a radially inwardly facing flange portion and an axially outwardly facing flange portion joined thereto, a cover member for disposition at the outerside of the wheel including a sheet metal body having a margin for overlying said flange portions and provided with an underturned flange structure engageable with the axially outwardly facing flange portion of the rim and having generally axially inwardly extending cover retaining extension structure thereon engageable with the radially inwardly facing flange portion, said cover member margin having an annular reinforcing rib projecting generally axially inwardly and backed up against the juncture of said underturned flange structure and said cover retaining extension structure, the radially inner side of said rib comprising a flange extending obliquely generally radially outwardly and axially inwardly toward, and in reinforcing strut relation to, the portion of said rib which is backed up against said juncture.

2. A wheel structure as defined in claim 1, wherein said cover member has a generally axially outwardly projecting annular reinforcing rib contiguous said first-mentioned rib, and said obliquely extending flange comprises the radially outer side of said axially outwardly projecting rib.

3. A wheel structure as defined in claim 2, wherein the cover member has radially inwardly contiguous said axially outwardly projecting rib an intermediate annular generally axially inwardly dished portion.

References Cited in the file of this patent

UNITED STATES PATENTS

| | | |
|---|---|---|
| 2,308,616 | Lyon | Jan. 19, 1943 |
| 2,674,495 | Lyon | Apr. 6, 1954 |
| 2,761,530 | Dawley | Sept. 4, 1956 |
| 2,772,924 | Landell | Dec. 4, 1956 |